United States Patent [19]

Lin et al.

[11] Patent Number: 4,934,512
[45] Date of Patent: Jun. 19, 1990

[54] CLEANING DEVICE FOR ARMREST BELT CONVEYOR OF THE ELECTRIC ESCALATOR

[76] Inventors: Hwang F. Lin, No. 21, Pa Te Road, Chi Tu District, Keelung, Taiwan; Se K. C. Wu, 2-6-10 Ta Sen Nan, Ta Tien District, Tokyo, Japan

[21] Appl. No.: 324,436

[22] Filed: Mar. 16, 1989

[51] Int. Cl.$^5$ .............................................. B65G 45/00
[52] U.S. Cl. ..................................... 198/495; 198/497; 198/338
[58] Field of Search ............... 198/335, 337, 338, 494, 198/495, 497; 15/256.5, 256.51, 256.52, 256.6

[56] References Cited

U.S. PATENT DOCUMENTS

| | | | |
|---|---|---|---|
| 3,910,400 | 10/1975 | Hishitani | 198/338 |
| 3,941,241 | 3/1976 | Hishitani | 198/494 |
| 3,946,853 | 3/1976 | Ishida | 198/338 X |

FOREIGN PATENT DOCUMENTS

| | | | |
|---|---|---|---|
| 2257841 | 5/1974 | Fed. Rep. of Germany | 198/495 |
| 2505874 | 8/1976 | Fed. Rep. of Germany | 198/495 |
| 0051183 | 4/1979 | Japan | 198/495 |
| 0914432 | 3/1982 | U.S.S.R. | 198/495 |
| 1022899 | 6/1983 | U.S.S.R. | 198/495 |

*Primary Examiner*—David A. Bucci
*Assistant Examiner*—D. Glenn Dayoan
*Attorney, Agent, or Firm*—Ostrolenk, Faber, Gerb & Soffen

[57] ABSTRACT

An apparatus for cleaning an armrest belt conveyor of an escalator. The apparatus permits use of the escalator during cleaning. Preferably, excess cleaner can be scraped off from the conveyor and reused.

14 Claims, 2 Drawing Sheets

CLEANING DEVICE FOR ARMREST BELT CONVEYOR OF THE ELECTRIC ESCALATOR

BACKGROUND OF THE INVENTION

1. Field of the Invention

The present invention relates to a cleaning device for cleaning and/or sterilizing an armrest belt conveyor of an electric escalator.

2. Description of the Related Art

A conventional cleaning device for cleaning an armrest belt conveyer of an electric escalator is illustrated in FIG. 3. The conventional cleaning device includes a spreader C which spreads cleanser on the surface of the armrest belt conveyer B as the conveyer B moves on an armrest A. A scraper D scrapes excess cleanser from the surface of the conveyer B. A container E holds the cleanser which is scraped off by the scraper D. A wiping device F wipes the surface of the conveyer B. The spreading device C, the scraper D, and the wiper F are arranged, in turn, on the conveyer B.

The spreader C is formed of a strong liquid absorbefacient material G and a cleanser container I. The material G contacts the surface of the conveyer B and the cleanser container I covers the material G. The container I has a cleanser providing hole H therein. A supporter J fixes the container I on the armrest A.

The scraper D has an opening which fits the upper rim of the conveyer B so as to contact the upper part of the conveyer B. The scraper D has two side ends which droop down to the container E.

A block L is formed so as to properly fit the conveyer B. The block L presses a wiper K of the device F close to the conveyer B. A string M connects the spreader C, the scraper D, and the wiping device F at the desired spacing.

In operation, cleanser is poured into the container I. While the conveyer B is moving, the cleanser flows through the hole H, permeates the material G, and is spread onto the surface of the conveyer B. Excess cleanser scraped from the conveyer B drops directly into the container E. The wiper K wipes the surface of the conveyer B clean.

Disadvantageously, when the device illustrated in FIG. 3 is used to clean the conveyer B, the conveyer B cannot be used. This is because the cleaning device must be equipped on the upper part of the conveyer B so that the cleanser permeates the material G by gravity.

Another disadvantage is that the cleanser scraped off by the scraper D flows down into the container E. Scraped off cleanser cannot be sent back into the container I for reuse.

SUMMARY OF THE INVENTION

A main object of the invention is to solve the disadvantages of the prior art.

The present invention is directed toward an apparatus for cleaning an armrest belt conveyor of an escalator, the apparatus including: (A) a container for containing a supply of cleaning liquid, the container being dimensioned so as to fit beneath the armrest belt conveyer of the escalator at a lower front end of the armrest belt conveyer so as not to interfere with the use of the escalator; and (B) a spreading device located within the container, the spreading device including: (a) a lower absorbent end for absorbing cleaning liquid upwardly from the supply of cleaning liquid; and (b) an upper end for spreading cleaning liquid onto the armrest belt conveyer during use of the escalator.

With the present invention, the electric escalator can be used during cleaning. Therefore, the armrest belt conveyer can be frequently cleaned and sterilized so as to ensure its sanitation and tidiness.

Furthermore, excess cleanser scraped off by the scraper automatically drops back down into the container for reuse.

Other features and advantages of the present invention will become apparent from the following description of preferred embodiments of the invention, with reference to the accompanying drawings.

DETAILED DESCRIPTION OF THE PREFERRED EMBODIMENTS

Figure 1:
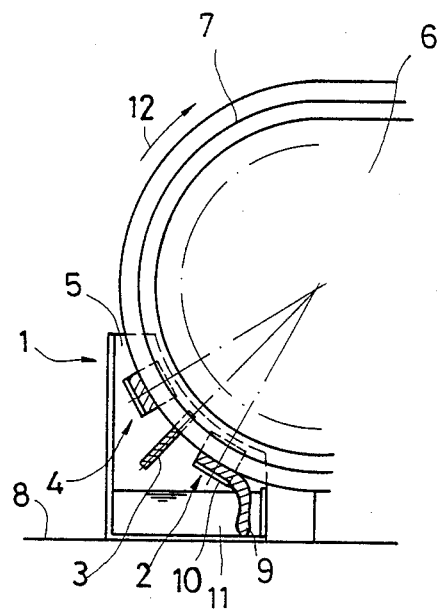
FIG. 1 is a side view of a cleaning device in accordance with the invention.
Figure 2:
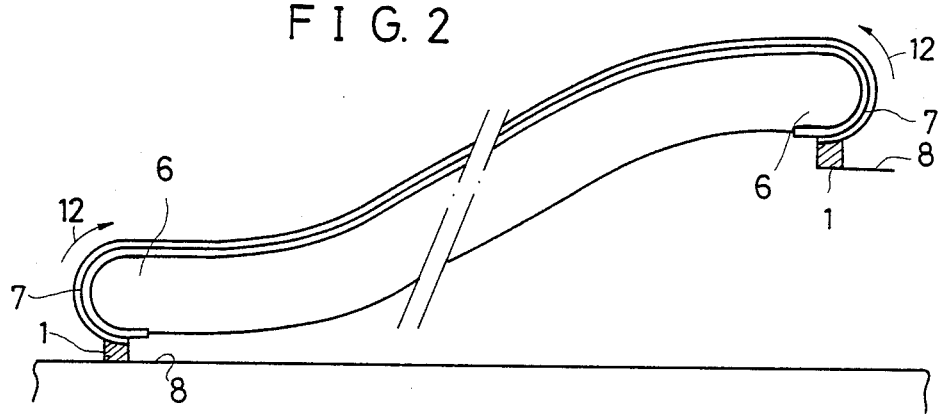
FIG. 2 is a side view illustrating the position of the cleaning device with respect to an armrest belt conveyer of an electric escalator.

Referring to FIGS. 1 and 2, a preferred embodiment in accordance with the invention includes a container 1, a spreading device 2, a scraper 3, and a wiping device 4. The spreading device 2, the scraper 3, and the wiping device 4 are located within the container 1. The container 1 is a bottom air-proof utensil. The container 1 includes a short wall, a tall wall, and two arched side walls. The side walls form a two-sided plank 5 on whose upper rim is an arched opening designed to fit matching arches on the bottom part of an armrest of an electric escalator near where an armrest belt conveyer 7 moves upwardly from an exit on a floor 8. The opening of the two-sided plank 5 fits the arched part of the conveyer 7 very well. The container 1 is set on the two edges of the electric escalator.

A spreading device 2 (including a strong liquid absorbefacient material 9 and a cover 10) is connected to the opening of the two-sided plank, adjacent one side of the escalator. The upper end of the material 9 is fastened by the cover 10 which is, in turn, connected to the outer rim of the conveyer 7. The lower end of the material 9 contacts the bottom of the container 1. This makes it easier to absorb the mixture of cleanser and bactericide stored in the container 1. When the conveyer 7 is running in the direction indicated by the arrow 12, the mixture is spread onto the surface of the conveyer 7.

Figure 3:
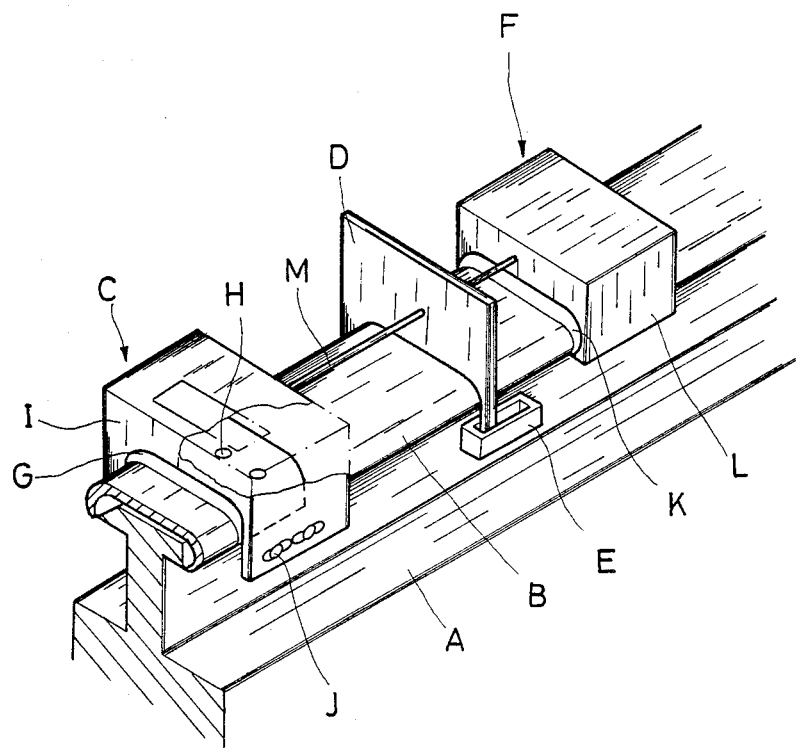
FIG. 3 illustrates a conventional device for cleaning an armrest belt conveyor of an electric escalator.

The scraper 3 and the wiping device 4 are structurally similar to the scraper D and the wiping device E of the conventional device illustrated in FIG. 3. The scraper 3 and the wiping device 4 follow the running direction of the conveyer 7 in turn. The difference is that excess mixture 11 on the surface of the conveyer 7 which is scraped off by the scraper 3 automatically falls by gravity into the container 1 for reuse, i.e., to be reabsorbed by the lower absorbent end of the spreading device 2. The mixture of cleanser and bactericide is thus saved.

The cleaning device can be used without discontinuing use of the escalator since the cleaning device is fitted on the floor 8 where the conveyer 7 rises upwardly from the exit.

The invention ensures cleanliness and sanitation.

Further, the invention can be fastened on the armrest belt conveyer by only using a hanging device. The operation and usage of the electric escalator will not be obstructed. The excess mixture scraped off by the scraper automatically drops back into the container 1.

Although the present invention has been described in connection with particular embodiments thereof, many other variations and modifications and other uses will become apparent to those skilled in the art. It is preferred, therefore, that the present invention be limited not by the specific disclosure herein, but only by the appended claims.

We claim:

1. An apparatus for cleaning an armrest belt conveyer of an escalator, said apparatus comprising:
   (A) a container for containing a supply of cleaning liquid, said container being dimensioned so as to fit beneath the armrest belt conveyer of the escalator at a lower front end of the armrest belt conveyer so as not to interfere with use of the escalator; and
   (B) a spreading device located within said container, said spreading device including:
      (a) a lower absorbent end for absorbing cleaning liquid upwardly from the supply of cleaning liquid; and
      (b) an upper end for spreading cleaning liquid onto the armrest belt conveyer during use of the escalator.

2. The apparatus of claim 1, further comprising a scraping device for scraping excess cleaning liquid from the conveyer, said scraping device being located within said container.

3. The apparatus of claim 2, wherein said scraping device and said container are arranged such that the excess cleaning liquid falls by gravity into the supply of cleaning liquid to be reabsorbed by said lower absorbent end of said spreading device.

4. The apparatus of claim 3, further comprising a wiping device for wiping cleaning liquid from the conveyer, said wiping device being located above said scraping device.

5. The apparatus of claim 4, wherein said container includes side walls which surround said spreading device, said scraping device, and said wiping device.

6. The apparatus of claim 5, wherein said side walls include a short wall, a tall wall, and two arched side walls connecting said short and tall walls, said side walls being dimensioned so as to fit against the lower front end of the escalator without interfering with the use of the escalator.

7. The apparatus of claim 6, wherein said container includes a bottom wall for supporting said container on the floor at the lower front end of the escalator.

8. A cleaning system, comprising:
   an escalator with an armrest belt conveyor, said armrest belt conveyor having a lower front end; and
   an apparatus for cleaning said armrest belt conveyor of said escalator, said apparatus including:
   (A) a container for containing a supply of cleaning liquid, said container being dimensioned so as to fit beneath said armrest belt conveyor of said escalator at said lower front end of said armrest belt conveyor so as not to interfere with use of said escalator; and
   (B) a spreading device located within said container, said spreading device including:
      (a) a lower absorbent end for absorbing cleaning liquid upwardly from the supply of cleaning liquid;
      (b) an upper end for spreading cleaning liquid onto said armrest belt conveyor during use of said escalator.

9. The system of claim 8, wherein said apparatus includes a scraping device for scraping excess cleaning liquid from said conveyor, said scraping device being located within said container.

10. The system of claim 9, wherein said scraping device and said container are arranged such that the excess cleaning liquid falls by gravity into the supply of cleaning liquid to be reabsorbed by said lower absorbent end of said spreading device.

11. The system of claim 10, wherein said apparatus includes a wiping device for wiping cleaning liquid from said conveyer, said wiping device being located above said scraping device.

12. The system of claim 11, wherein said container includes side walls which surround said spreading device, said scraping device, and said wiping device.

13. The system of claim 12, wherein said side walls include a short wall, a tall wall, and two arched side walls connecting said short and tall walls, said side walls fitting against said lower front end of said escalator without interfering with use of said escalator.

14. The system of claim 13, wherein said container includes a bottom wall for supporting said container on the floor at said lower front end of said escalator.

* * * * *